May 9, 1961 M. V. SULLIVAN 2,983,655

TREATMENT OF SEMICONDUCTIVE BODIES

Filed Dec. 18, 1957 2 Sheets-Sheet 1

INVENTOR
MILES V. SULLIVAN
BY [illegible]
ATTORNEY

May 9, 1961 M. V. SULLIVAN 2,983,655
TREATMENT OF SEMICONDUCTIVE BODIES
Filed Dec. 18, 1957 2 Sheets-Sheet 2

INVENTOR
MILES V. SULLIVAN
BY George S. Indig
ATTORNEY 2,983,655

TREATMENT OF SEMICONDUCTIVE BODIES

Miles V. Sullivan, Summit, N.J., assignor to Bell Telephone Laboratories, Incorporated, New York, N.Y., a corporation of New York Filed Dec. 18, 1957, Ser. No. 703,699

3 Claims. (Cl. 204—15)

This invention relates to a method of preferentially treating a selected portion of the surface of a crystalline semiconductive body. The method of the present invention involves contacting the selected portion of the surface with a liquid, which may serve the purpose of an etching, cleaning, washing or plating solution.

Semiconductive devices, such as rectifiers and transistors, are being used in ever-increasing numbers in the manufacture of various types of electrical components. An important reason for such widespread use is the small size of these semiconductive devices. However, the fact that the semiconductive body from which such a device is made may be as small as 20 mils square and 3 mils thick gives rise to handling problems in the fabrication of the device. Entirely new methods of mass production including new handling techniques have been developed, and a new science of "micro-manipulation" has come into being.

In the fabrication of a semiconductive device it is frequently necessary that a selected portion of the surface be preferentially contacted with a liquid. In certain instances it may be fatal to the operability of the device should portions other than the selected portion of the surface be contacted. For example, it may be necessary to etch one surface of a semiconductive body and at the same time to protect other vulnerable surfaces from being contacted by the etchant. Heretofore, to protect the vulnerable surfaces, it was necessary to mask them with wax or other similar etchant-resistant material prior to immersing the body in the etchant. Such protective masking materials are chosen because of their excellent adhesive properties and therefore are difficult to remove after they have served their useful purpose. Other processes such as plating, cleaning, and indeed any treatment which involves selectively treating a portion of the surface of a semiconductive body with a liquid heretofore required the use of such masking procedures.

The present invention relates to a method of preferentially contacting a selected portion of the surface of a semiconductive body with a liquid which obviates the necessity of a masking procedure. It has been determined that a body of semiconductive material, whose dimensions are within certain limits, floats upon the surface of any one of a class of liquids which does not wet the body, i.e. where the contact angle subtended by the liquid at the junction of the air-liquid interface and the body surface is in the range of 90° to 180°. Aqueous solutions of inorganic solutes fall into this classification. Examples of such solutions which are commonly used in the fabrication of semiconductive devices are nitric acid-hydrofluoric acid etchants, and electrolytes containing inorganic salts and/or bases and acids. Thus, if one broad face of a semiconductive wafer is to be treated by contacting with a liquid, it is floated in the liquid with the face to be treated in contact therewith. Such a procedure dispenses with the necessity for masking the opposite broad face which may be especially vulnerable to attack by the liquid being used.

It has been determined further that if the inner walls of the vessel are wetted by the liquid contained, the floating wafer will center itself in the vessel with respect to the walls. Such automatic centering is advantageous in electrolytic processes which require contacting the small semiconductive body with an electrode. Heretofore, such contact was accomplished by a manual operation. However, it is readily appreciated that when dealing with bodies of dimensions of the order of magnitude of several mils, such manipulation is difficult. By use of the present invention the operation of contacting the electrode to the body is facilitated. For example, the contacting electrode may be attached to the end of a spring-loaded arm which is pivoted so that it can be raised or lowered. The pivot point is positioned such that the electrode intersects the surface of the liquid at its geometric center. This insures that the lowered electrode will contact the centered floating wafer.

The invention will be better understood from the following more detailed description taken in conjunction with the accompanying drawings in which.

Figure 1:
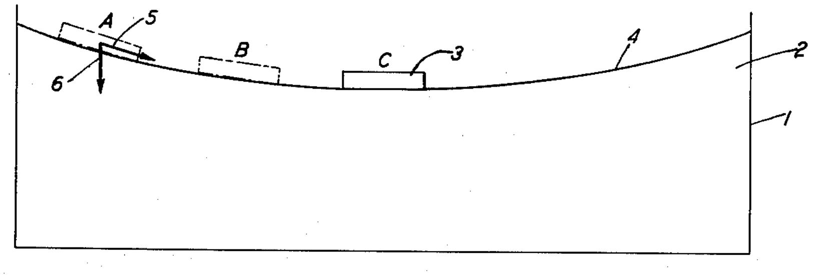
Fig. 1 is a sectional elevational view of apparatus suitable for the practice of this invention.

With respect now more particularly to Fig. 1 there is depicted a sectional view of vessel 1, designed in accordance with principles to be discussed in detail below, which contains a liquid 2. A semiconductive body 3 is floating on the surface of liquid 2. Body 3 floats as a result of a favorable balance of the cohesive forces between the molecules of liquid in the surface 4 over the sum of the force of gravity acting on body 3 and the forces of adhesion between the molecules of liquid in the surface 4 and body 3. It has been determined that a semiconductive body will float if the product of its wetted perimeter and the surface tension of the liquid is greater than the weight of the body, and, for the purposes of this invention, preferably double the weight of the body. Semiconductive bodies as large as 250 mils x 250 mils x 5 mils, and 1000 mils x 500 mils x 8 mils have been floated in accordance with this invention.

Surface 4 is concave by virtue of attractive forces existing between the molecules of liquid 2 and the walls of vessel 1. Semiconductive body 3 when placed on the surface 4 at position A is acted upon by a centering force, 5 which is the component of the force of gravity 6 tangential to the surface 4 at position A. Such a component causes body 3 to slide down the surface 4 past position B to the lowest point of surface 4, position C, thereby centering the body 3 in vessel 1.

The success of this automatic centering is directly related to the magnitude of the centering force 5. The magnitude of force 5 is in turn dependent upon the degree of concavity of the surface 4. The greater the attractive force between the liquid and the walls of the containing vessel, the higher the liquid "climbs" up the walls, and the greater the concavity of the surface. The degree of concavity also increases as the ratio of the wetted wall perimeter to the surface area of the liquid increases. Thus the magnitude of centering force 5 decreases as the vessel size increases, all other factors constant. Therefore, in terms of the time necessary for the floating semiconductor body to reach rest position C at the low point of the surface 4, a small vessel is preferred for this invention.

The cleanliness of the surface of the liquid upon which the body is floating is also an important factor with respect to the time required for centering, since a film of impurities on the surface acts as an obstacle to the movement of the floating body. This film hinders the movement of the body and thereby increases the time necessary for the body to become centered. When a large vessel is used for the practice of this invention thereby reducing the centering force, a high degree of care is necessary with respect to the cleanliness of the surface of the liquid to insure a relatively short time requirement for automatic centering of the floating body. It has been determined that a vessel which provides a surface area of liquid of approximately 7 square inches and whose longest dimension is no greater than twice its shortest dimension can be effectively utilized for the practice of this invention with little attention required to the question of cleanliness.

It is possible to achieve a desired orientation of the floating body with respect to the walls of the vessel. For example, if the body to be floated is square, and the vessel containing the liquid is square, the body becomes positioned with its sides parallel to the sides of the vessel. Furthermore, a rectangular body floating in a rectangular vessel positions itself with its longer dimension parallel to the longer dimension of the vessel.

Figure 2:
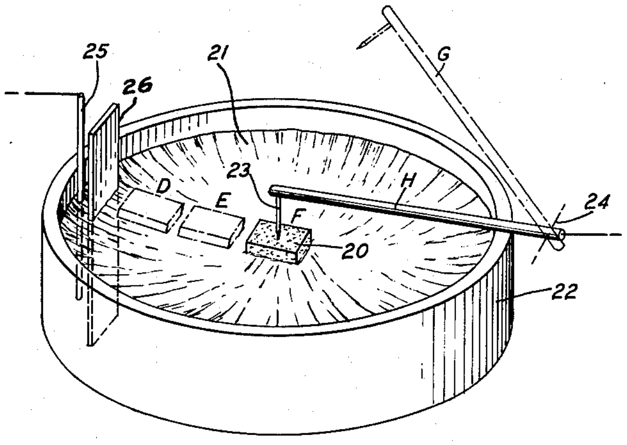
Fig. 2 is a perspective schematic view of apparatus for electrolytically treating a semiconductive body in accordance with this invention.

Fig. 2 is a schematic view of an apparatus suitable for the electrolytic treatment of a selected portion of the surface of a semiconductive body. A semiconductive body 20 of requisite dimensions for floating in the liquid used, is placed onto the surface 21 of the liquid at position D, for example. By virtue of the concave shape of surface 21 body 20 passes from position D to position E and comes to rest at position F, the center of vessel 22. Electrode 23 is used to make electrical contact to body 20, and is attached to pivot point 24 so that it may be raised and lowered. Pivot point 24 is prepositioned so that electrode 23 contacts the geometric center of the liquid surface 21 when lowered. Electrode 23 is maintained at an elevated position, for example at position G shown in Fig. 2, prior to placing semiconductive body 20 upon surface 21. After body 20 has been floated and centered, electrode 23 is lowered to position H to make contact with body 20. Electrode 23 is preferably spring-loaded to insure that the force exerted upon body 20 is sufficient to make good electrical contact. In order to prevent submersion of body 20 care must be taken not to exceed the maximum permissible force which the floating body will sustain. This maximum force is approximately determined by subtracting twice the weight of the body from the product of the wetted perimeter of the body and the surface tension of the liquid.

Electrode 25 plus a current source, not shown, connected so as to produce a potential difference between electrode 25 and electrode 23 is used to complete the electrical circuit. Partition 26 is provided to prevent electrolyte from splashing onto the dry upper surface of body 20. Such splashing results, for example, from the liberation of hydrogen at electrode 25 when it is biased cathodically.

An important use of this technique is in the fabrication of diffused based transistors of the type described in copending application Serial No. 496,202, filed March 23, 1955, by Messrs. Dacey, Lee and Shockley. Briefly, such a transistor has been fabricated heretofore by exposing a p-type semiconductive wafer to vapors of an n-type conductivity inducing impurity thereby forming an n-type skin over the entire surface of the wafer. By well-known evaporation and alloying techniques an emitter, consisting of an aluminum strip, and a base contact, consisting of a gold-antimony alloy strip, are then deposited on one broad face of the diffused wafer. Ohmic contact is made to the p-type interior, the collector region, by soldering a platinum tab to the other broad face of the wafer using indium as the solder. The collector junction is then exposed by etching to prevent the n-type skin on the sides of the wafer from short-circuiting the collector region which would otherwise act as a conducting path for carriers between the base region and the collector contact. Heretofore this was accomplished by masking all portions of the surface of the wafer except the four sides with a material which is impervious to chemical etchants commonly used in the art. The masked wafer was then dipped into a chemical etchant to remove the undesirable n-type skin from the sides of the wafer. This masking step is a delicate and time consuming operation. Moreover, since the masking material is chosen for its tenacity in adhering to the semiconductive material, it is accordingly difficult to remove after it has served its purpose. The masking and etching steps follow the steps of evaporating and alloying the contacts onto the semiconductive body due to the reluctance to heat the semiconductive body after the masking procedure. This reluctance is founded on the belief that heating a body whose surface contains impurities results in deterioration of the lifetime. Since the masking medium is difficult to remove, the tendency is to perform the heating steps prior to masking.

Figure 3A:
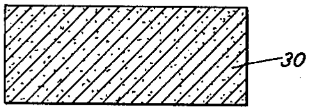
Figs. 3A through 3E are front elevational views depicting a semiconductive body in successive stages of a process utilizing the present invention.
Figure 3B:
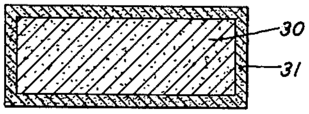
Figure 3C:
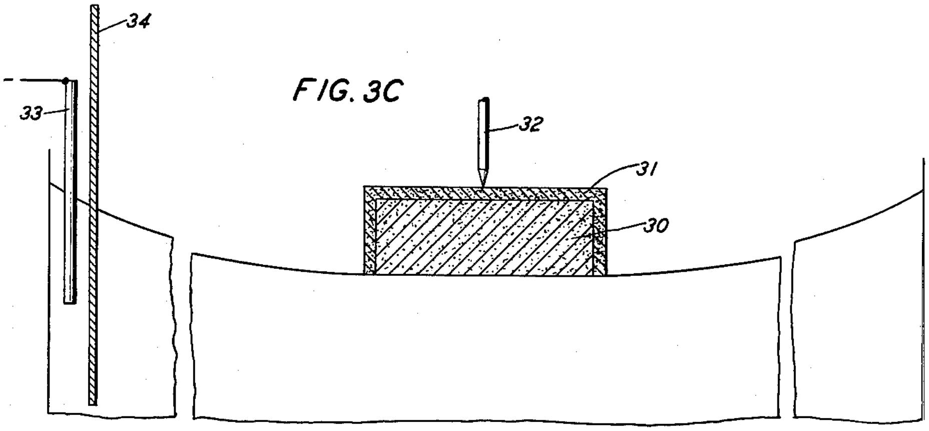
Figure 3D:
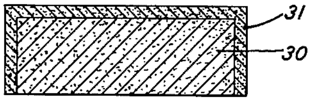
Figure 3E:
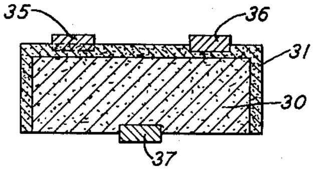

The present invention makes possible the production of transistors of this type in a process which eliminates these masking procedures. Figs. 3A through 3E show sections through a bar of semiconductive material in successive stages of fabrication in a process in accordance with this invention for producing transistors of the type described above. Fig. 3A depicts a bar 30 of p-type germanium semiconductive material approximately 220 mils long, 60 mils wide, and 3 mils thick. This bar is of a size such that eight transistor devices can be cut therefrom. Fig. 3B depicts bar 30 with an n-type skin 31 having been formed over the entire surface thereof in accordance with usual diffusion techniques. (See aforementioned application Serial No. 496,202.) Fig. 3C is a sectional view of bar 30 being electrolytically etched in accordance with the present invention. The procedure followed is similar to that described above with respect to the embodiment of Fig. 2. Electrode 32 is shown contacting bar 30. Electrode 33 together with a current source, not shown, completes the electrical circuit arranged to bias electrode 33 negative with respect to electrode 32. Illumination of the surface being etched is required to overcome the rectifying barrier between the surface and the liquid. (See B.S.T.J. 35, 333 (1956), "Electrolytic Shaping of Germanium and Silicon," by A. Uhlir.) Such illumination is not shown in Fig. 3. Partition 34 is utilized to prevent splashing of the electrolyte on the upper surface of bar 32. Fig. 3D is a sectional view of bar 30 after the electrolytic etching step with the n-type skin removed from one broad face. Fig. 3E is a sectional view of a bar 30 with emitter 35, base contact 36, and collector contact 37 affixed thereto. The emitter 35 and contacts 36 and 37 are formed by well-known evaporation and alloying techniques (see aforementioned application Serial No. 496,202). The collector contact is conveniently made using the same metal or metallic alloy as is used for producing the emitter. Since eight transistors are to be made from bar 40, the emitter, base, and collector contacts for the eight devices described are located accordingly. To reduce the collector junction capacitance, the portion of the n-skin upon which the emitter 35 and base contact 36 are made can be isolated from the rest of the n-skin by suitable etching techniques.

The present invention may be used for other electrolytic processes such as electroplating and electrocleaning. Examples of the use of this invention for these purposes are described in the examples below.

It is to be understood that the techniques of the present invention may be varied by one skilled in the art without departing from the spirit and scope of the invention. The present invention is applicable to the treating of selected portions of the surface of germanium, silicon, germanium-silicon alloy, and group III–group V semiconductive bodies within the size limits defined above.

Examples of the present invention are set forth below.

*Example 1*

An apparatus such as that shown in Fig. 2 was utilized for electroetching the n-type skin from a p-type germanium body of dimensions 220 mils x 60 mils x 3 mils. The n-skin was 0.05 mil thick having been formed by diffusion in the usual manner. One percent sulfuric acid was used as the electrolyte and was contained in a glass Petri dish 40 millimeters in diameter. A platinum cathode was used. The germanium body was floated in the glass dish and was illuminated by means of a microscope lamp. (See "Electrolytic Shaping of Germanium and Silicon," BSTJ 35, 333 (1956).) The electrode used to contact the germanium bar was the pointer of a voltmeter. By applying the proper potential to the voltmeter the position of the pointer was controlled and the proper amount of loading on the contacting electrode was obtained. A current of 1 milliampere was passed through the positively biased germanium bar for 5 minutes.

Treating the germanium bar by the technique described produced a germanium bar with the n-skin completely removed from one broad face leaving the opposite broad face completely unchanged.

*Example 2*

A bar of germanium was nickel plated by the practice of the present invention utilizing electroless nickel plating techniques. (See "Electroless Nickel Plating for Making Ohmic Contact to Silicon," Journal of the Electrochemical Society, volume 104, pp. 226–230, April 1957.) A bar of germanium of dimensions 200 mils x 69 mils x 3 mils was floated in a bath of the following composition which was maintained at approximately 95° C. and contained in a Petri dish similar to the one described in Example 1:

| | Grams per liter |
|---|---|
| Nickel chloride | 30 |
| Sodium hypophosphite | 10 |
| Ammonium citrate | 65 |
| Ammonium chloride | 50 |

Ammonium hydroxide was added until the solution turned from green to blue.

The bar of germanium was treated in this manner for approximately 5 minutes and was then removed from the bath.

The resultant bar had an adherent plate of nickel 0.06 mil thick on the surface which was in contact with the plating bath. The opposite broad face of the bar was unplated.

*Example 3*

A bar of germanium similar to the one described in Example 2 was electrocleaned utilizing an apparatus as described in Example 1 above.

The electrolyte used was a 1/10 percent solution of potassium hydroxide. The electrode contacting the germanium bar was biased negatively thereby producing hydrogen at the germanium-liquid interface. A current of about 1 milliampere was employed.

The germanium bar was treated in this manner for 5 minutes. The broad face of the bar which was in contact with the electrolyte was found to have been "cleaned" by this process.

What is claimed is:

1. The method of electrolytically treating a portion of the surface of a semiconductive body which comprises the steps of floating a body consisting essentially of a semiconductive material selected from the group consisting of germanium, silicon, germanium-silicon alloys, and group III–group V alloys in a bath of electrolyte so that said portion is in contact with said electrolyte, the contact angle subtended by the said electrolyte at the junction of the air-liquid interface and the body surface being in the range of from 90° to 180°, and said body having a weight less than the product of the wetted perimeter of said body and the surface tension of said electrolyte, the surface area of said bath electrolyte being a maximum of approximately 7 square inches and having a configuration such that its longest dimension is no greater than twice its shortest dimension, and said electrolyte being contained in a vessel of such composition that it wets the walls thereof, allowing said body to float to the geometric center of the surface of said electrolyte, contacting said body with a prepositioned first electrode, placing into said electrolyte a second electrode, said second electrode being connected through a current source to said first electrode thereby forming a circuit including the said semiconductive body and said electrolyte, and causing a current to flow through said circuit.

2. The method of claim 1 in which said first electrode is biased positively with respect to said second electrode.

3. The method of claim 1 in which said first electrode is biased negatively with respect to said second electrode.

References Cited in the file of this patent

UNITED STATES PATENTS

| | | |
|---|---|---|
| 1,394,147 | Crane | Oct. 18, 1921 |
| 2,111,206 | Coe | Mar. 15, 1938 |
| 2,686,279 | Barton | Aug. 10, 1954 |
| 2,763,608 | Pool | Sept. 18, 1956 |

FOREIGN PATENTS

| | | |
|---|---|---|
| 12,723 | Great Britain | Apr. 18, 1912 |